United States Patent
Sellers, Jr. et al.

(10) Patent No.: US 6,946,963 B2
(45) Date of Patent: Sep. 20, 2005

(54) SECURE STORAGE DISC AND DISC SURVEILLANCE SYSTEM

(75) Inventors: John W. Sellers, Jr., Spring Valley, OH (US); Eugene E. Mayle, Jr., Dayton, OH (US)

(73) Assignee: Spectra Research, Inc., Dayton, OH (US)

( * ) Notice: Subject to any disclaimer, the term of this patent is extended or adjusted under 35 U.S.C. 154(b) by 307 days.

(21) Appl. No.: 10/272,518

(22) Filed: Oct. 16, 2002

(65) Prior Publication Data

US 2003/0086361 A1 May 8, 2003

Related U.S. Application Data

(60) Provisional application No. 60/329,677, filed on Oct. 16, 2001.

(51) Int. Cl.[7] .............................................. G08B 13/14
(52) U.S. Cl. .................................. 340/572.5; 340/572.8
(58) Field of Search ........................... 340/572.1, 572.3, 340/572.4, 572.5, 572.8, 10.1, 10.42; 235/488, 492; 343/700 MS, 795

(56) References Cited

U.S. PATENT DOCUMENTS

| | | |
|---|---|---|
| 2,774,060 A | 12/1956 | Thompson |
| 3,521,280 A | 7/1970 | Janco et al. |
| 3,624,631 A | 11/1971 | Chomet et al. |
| 3,765,007 A | 10/1973 | Elder |
| 3,810,147 A * | 5/1974 | Lichtblau ................. 340/572.3 |
| 3,863,244 A | 1/1975 | Lichtblau |
| 3,913,219 A | 10/1975 | Lichtblau |
| 3,967,161 A | 6/1976 | Lichtblau |
| 4,021,705 A | 5/1977 | Lichtblau |
| 4,498,076 A | 2/1985 | Lichtblau |
| 4,567,473 A | 1/1986 | Lichtblau |
| 4,583,083 A | 4/1986 | Bogasky |
| 4,751,516 A | 6/1988 | Lichtblau |
| 4,774,521 A | 9/1988 | Okada et al. |
| 4,831,363 A | 5/1989 | Wolf |
| 4,914,421 A | 4/1990 | d'Alayer de Costemore d'Ar |
| 5,081,445 A | 1/1992 | Gill et al. |
| 5,081,446 A | 1/1992 | Gill et al. |
| 5,241,299 A | 8/1993 | Appalucci et al. |
| 5,276,431 A | 1/1994 | Piccoli et al. |
| 5,367,290 A * | 11/1994 | Kind et al. ............... 340/572.3 |
| 6,091,607 A | 7/2000 | McKeown et al. |
| 6,592,043 B1 * | 7/2003 | Britton ....................... 235/492 |
| 6,621,410 B1 * | 9/2003 | Lastinger et al. ......... 340/10.42 |
| 6,806,842 B2 * | 10/2004 | King et al. ................. 343/795 |

FOREIGN PATENT DOCUMENTS

| | | | |
|---|---|---|---|
| EP | 1302893 A1 * | 4/2003 | |
| JP | 2001297568 A * | 10/2001 | |
| JP | 2002288963 A * | 10/2002 | |
| JP | 2003058840 A * | 2/2003 | |

* cited by examiner

Primary Examiner—Van T. Trieu
(74) Attorney, Agent, or Firm—Dinsmore & Shohl LLP

(57) ABSTRACT

An information storage disc, a method of disc manufacture, and a scheme for improved disc surveillance are provided. Generally, the present invention utilizes the geometry and conductivity of a disc's information storage medium to establish an electrically resonant circuit in the disc body. The electrically resonant circuit may be used to detect, locate, and/or monitor the disc. In accordance with 37 CFR 1.72(b), the purpose of this abstract is to enable the United States Patent and Trademark Office and the public generally to determine quickly from a cursory inspection the nature and gist of the technical disclosure. The abstract will not be used for interpreting the scope of the claims.

59 Claims, 4 Drawing Sheets

SECURE STORAGE DISC AND DISC SURVEILLANCE SYSTEM

CROSS-REFERENCE TO RELATED APPLICATIONS

This application claims the benefit of U.S. Provisional Application Ser. No. 60/329,677, filed Oct. 16, 2001.

BACKGROUND OF THE INVENTION

The present invention relates to information storage discs and, more particularly to the design, manufacture, and surveillance of secure storage discs. For the purposes of defining and describing the present invention, it is noted that an information storage disc is a portable, generally planar disc-shaped structure upon which is stored information. The information is commonly stored as computer or machine-readable data on a portion of the disc. For example, by why of illustration and not limitation, two types of common information storage discs are commonly referred to as CDs and DVDs. CDs and DVDs are commonly used to hold information for music, data, or computer software.

The majority of a CD consists of an injection-molded piece of clear polycarbonate plastic. During manufacturing, this plastic is impressed with microscopic bumps arranged as a single, continuous, extremely long spiral track of data. Once the clear piece of polycarbonate is formed, a thin, reflective aluminum layer is sputtered onto the disc, covering the bumps. Then a thin acrylic layer is sprayed over the aluminum to protect it. A label or other graphical image is then printed onto the acrylic. A CD has a single spiral track of data, circling from the inside of the disc to the outside. The data track is approximately 0.5 microns wide, with 1.6 microns separating one track from the next. The elongated bumps that make up the track are each 0.5 microns wide, a minimum of 0.83 microns long, and 125 nanometers high. A laser beam is used to read the data. The laser beam is directed through the polycarbonate layer, reflects off the aluminum layer, and returns to an opto-electronic device that detects changes in the reflected light. The bumps on the disc reflect light differently than the lands (the rest of the aluminum layer), and the opto-electronic sensor detects that change in reflectivity. The electronics in the reader interpret the changes in reflectivity in order to read the data stored on the disc.

A DVD is very similar to a CD, but it has a much larger data capacity. A standard DVD holds about seven times more data than a CD. DVDs are typically of the same diameter and thickness as CDs, and they are made using some of the same materials and manufacturing methods. Like a CD, the data on a DVD is encoded in the form of small pits and bumps in the track of the disc. A DVD is composed of several layers of plastic, totaling about 1.2 millimeters thick. Each layer is created by injection molding polycarbonate plastic. This process forms a disc that has microscopic bumps arranged as a single, continuous and extremely long spiral track of data. Once the clear pieces of polycarbonate are formed, a thin reflective layer is sputtered onto the disc, covering the bumps. Aluminum is used behind the inner layers, but a semi-reflective gold layer is used for the outer layers, allowing the laser to focus through the outer and onto the inner layers. After all of the layers are made, each one is coated with lacquer, squeezed together and cured under infrared light. For single-sided discs, a label is silk-screened onto the nonreadable side. Typically, a mere 740 nanometers separate one data track from the next. The elongated bumps that make up the track are typically each 320 nanometers wide, a minimum of 400 nanometers long, and 120 nanometers high. DVDs can store more data than CDs because of the higher-density data storage in DVDs, the increased storage area on a DVD, and because DVD utilize multi-layer storage.

BRIEF SUMMARY OF THE INVENTION

The present inventors recognize a need for an information storage disc and a method of manufacture that provide for improved surveillance of the disc. Generally, the present invention utilizes the geometry and conductivity of a disc's information storage medium to establish an electrically resonant circuit in the disc body. The electrically resonant circuit may be used to detect, locate, and/or monitor the disc.

In accordance with one embodiment of the present invention, an information storage disc is provided comprising an information storage layer, a capacitive plate layer, a dielectric layer, and an electrical inductor. The information storage layer comprises an electrically conductive information storage medium. The capacitive plate layer comprises an electrically conductive capacitive plate. The dielectric layer comprises a dielectric portion positioned to isolate electrically the information storage medium and the capacitive plate. The electrical inductor is configured to complete an electrically resonant circuit comprising the electrical inductor and a dielectric capacitor. The dielectric capacitor comprises at least a portion of the information storage medium, at least a portion of the electrically conductive capacitive plate, and at least a portion of the dielectric portion of the dielectric layer.

In accordance with another embodiment of the present invention, an information storage disc is provided comprising a disc body, an information storage medium, at least one electrically conductive region, and an electrical inductor. The disc body defines an outer periphery, an inner periphery, and upper and lower disc surfaces. The information storage medium is disposed between the upper and lower disc surfaces. The information storage medium extends from a storage medium inner radius to a storage medium outer radius. The storage medium defines an electrical conductivity sufficient to function as a capacitance plate of a dielectric capacitor. The electrically conductive region is disposed between the upper and lower disc surfaces. The electrically conductive region and the information storage medium are electrically isolated by a dielectric portion of the disc body. At least a portion of the electrically conductive region and at least a portion of the information storage medium extend along a common radial portion of the disc body to define a capacitively coupled pair of capacitor plates. An electrical inductor is disposed between the upper and lower disc surfaces. The electrical inductor and the capacitively coupled pair of capacitor plates define an electrically resonant circuit.

In accordance with yet another embodiment of the present invention, an information storage disc surveillance system is provided. The system comprises an electromagnetic transmitter configured to generate an electromagnetic signal comprising at least one predetermined frequency, an electromagnetic receiver positioned to receive the electromagnetic signal and configured to detect resonance of the signal, and at least one information storage disc. The information storage disc comprises an electrically resonant circuit according to the present invention.

Accordingly, it is an object of the present invention to provide an improved secure information storage discs and an improved schemes for the manufacture and surveillance of secure information storage discs. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
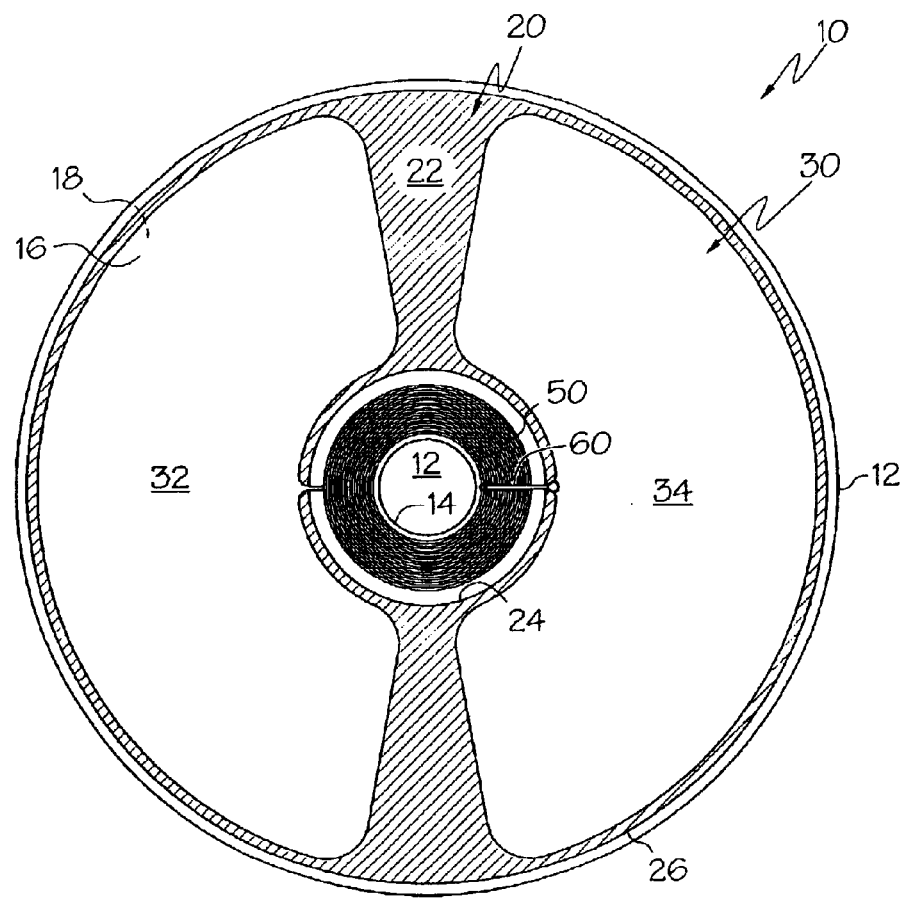
FIG. 1 is a schematic illustration of an information storage disc according to one embodiment of the present invention.

Referring to FIGS. 1–5, an information storage disc 10 according to the present invention is illustrated. The disc 10 comprises an outer periphery 12, an inner periphery 14, upper and lower disc surfaces 16, 18, an information storage layer 20, a capacitive plate layer 30, a dielectric layer 40, and an electrical inductor 50. The information storage layer 20 comprises an electrically conductive information storage medium 22. The information storage medium 22 extends from a storage medium inner radius 24 to a storage medium outer radius 26. Any suitable electrically conductive material may be used to form the information storage layer 20. For example, the information storage layer 20 may be formed and encoded in accordance with CD and DVD fabrication techniques as an aluminum layer or another type of metal layer. The information storage disc may comprise a plurality of information storage layers 20 carrying data selected from audio, video, software, and combinations thereof. Data may be read from the disc 10 in any suitable manner—typically through use of a laser source directed at one of the upper and lower surfaces of the disc 10, or both.

Figure 2:
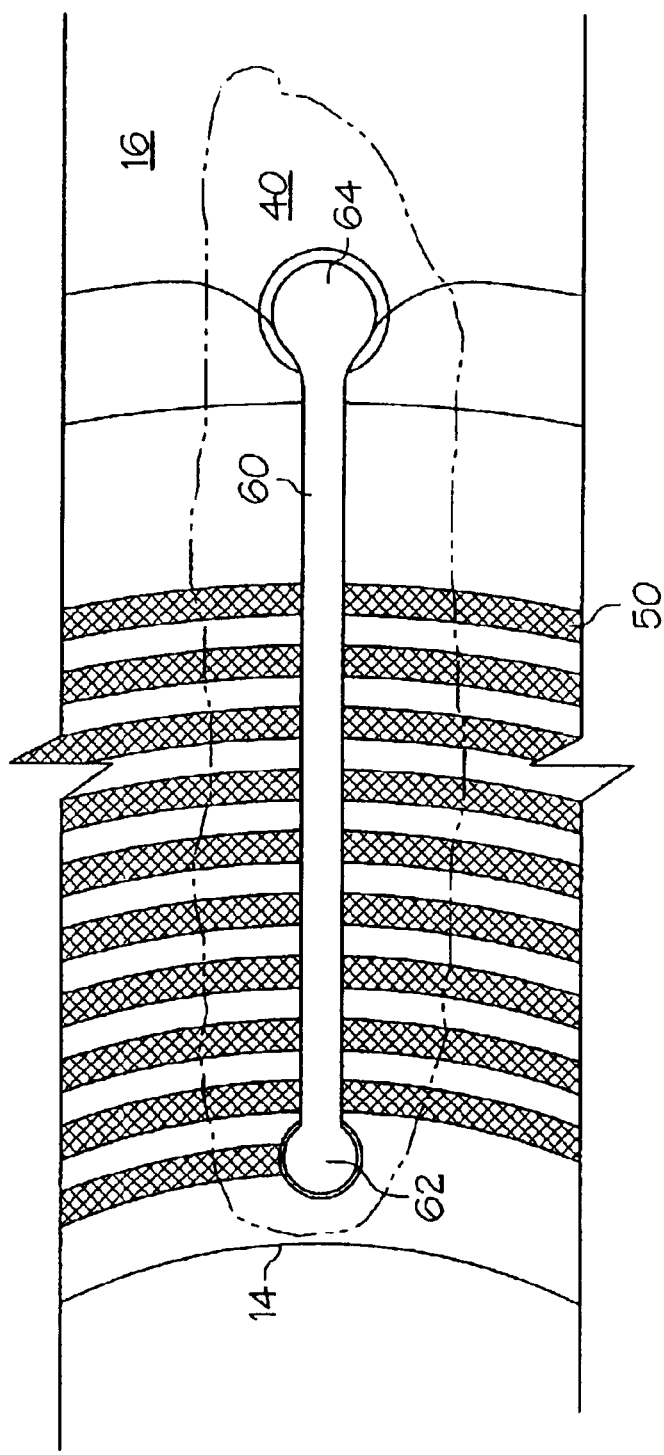
FIG. 2 is an illustration of a resonant circuit according to one embodiment of the present invention.
Figure 3:
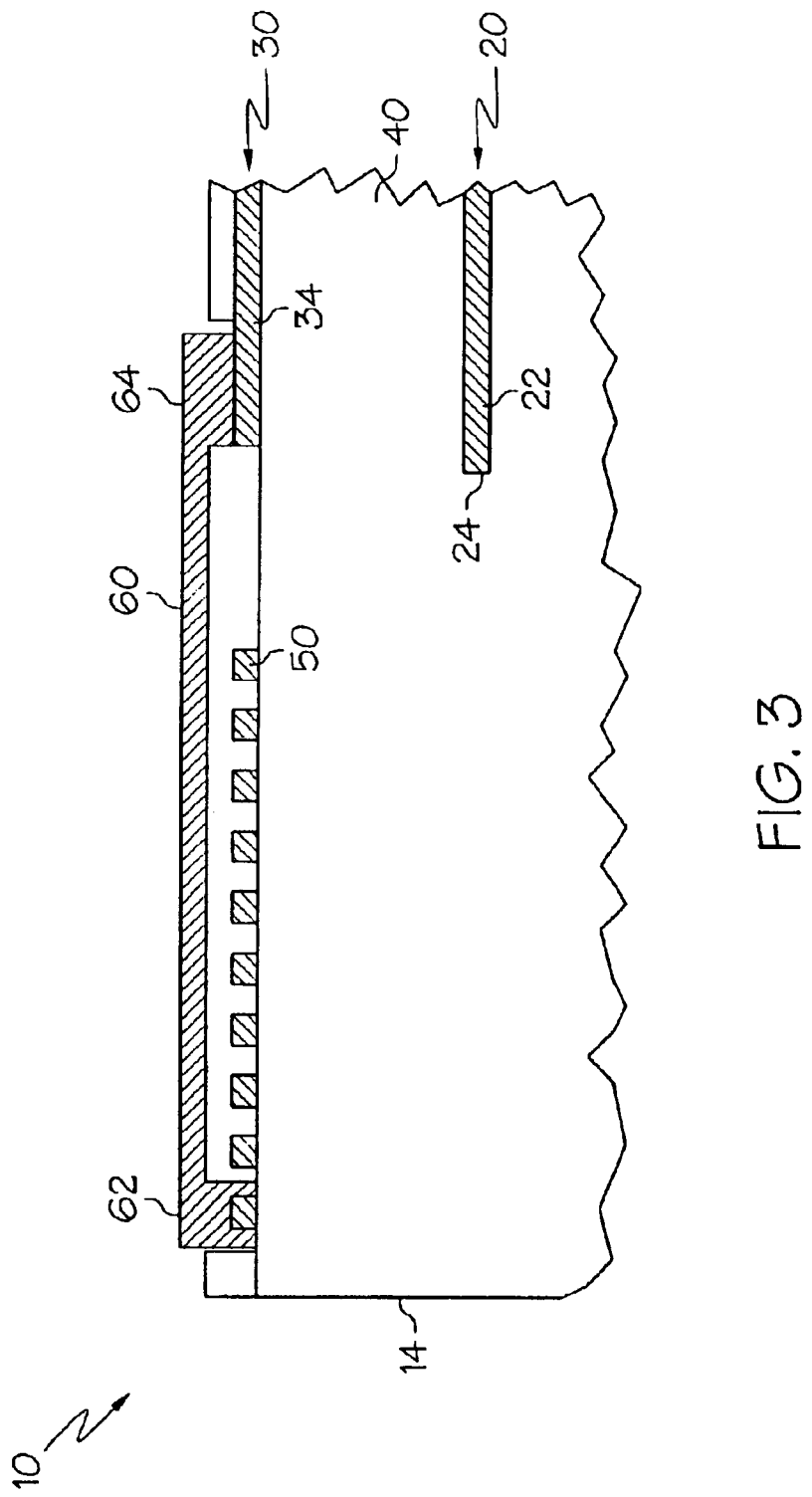

The capacitive plate layer 30 includes electrically conductive capacitive plates 32, 34. The dielectric layer 40, which is illustrated in FIGS. 2 and 3 but has been left out of FIG. 1 to preserve clarity in illustrating the invention, comprises a dielectric portion positioned to isolate electrically the information storage medium of the information storage layer 20 and the capacitive plates 32, 34 of the capacitive plate layer 30. Typically, the disc 10 will embody a plurality of dielectric portions—coplanar and non-coplanar. For the purposes of describing and defining the present invention, it is noted that the term "plate" as utilized herein in reference to capacitive components is not limited to substantially planar or flat structures and is not intended to denote any type of geometrical, physical, or dimensional meaning. The term is merely used in to identify a component as part of a capacitor structure. Indeed, a "capacitive plate" according to the present invention is any structure having an electrical conductivity sufficient to enable it to function as one of the conductive plates of a dielectric capacitor.

Figure 4:
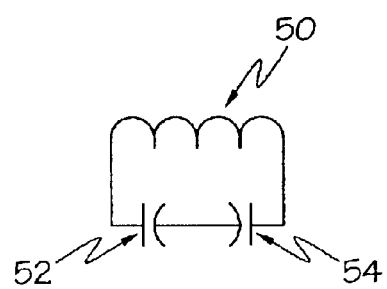
FIGS. 3 and 4 are schematic illustrations of a fuse configuration for an information storage disc according to one embodiment of the present invention.

The electrical inductor 50 is configured to complete an electrically resonant circuit comprising the electrical inductor 50 and dielectric capacitors 52, 54 (see FIG. 4). Each of the dielectric capacitors is formed by a portion of the information storage medium 22, respective ones of the capacitive plates 32, 34, and at least a portion of the dielectric layer 40. More specifically, the electrically conductive capacitive plates 32, 34 may form independent plates of independent capacitors because they are electrically isolated from each other by dielectric material of the disc 10. The plates 32, 34 may be co-planar or may lie in different planes. Each plate 32, 34 forms a separate pair of capacitively coupled plates with a different portion of the information storage medium 22. For the purposes of describing and defining the present invention, it is noted that electric isolation does not preclude capacitive coupling.

As is clearly illustrated in the physical layout of FIG. 1, each of the independent electrically conductive capacitive plates 32, 34 avoid overlap. More specifically, the plates 32, 34 are arranged to exclude intersection of both plates 32, 34 by a single linear projection extending through the disc body, substantially perpendicular to a surface of the disc body. Similarly, the capacitive plates 32, 34 and the electrical inductor 50 may also avoid overlap. Further, the information storage medium 22 and the electrical inductor 50 may also avoid overlap.

It is contemplated that specific advantages may be achieved in reading data from or writing data to an information storage disc of the present invention if the capacitive plate layer comprises a conductive coating that is transparent or substantially transparent to laser radiation.

Regarding the electrical inductor 50, it is noted that the inductor 50 is also defined in a dielectric layer of the disc. Typically, fabrication efficiency will dictate that the capacitive plate layer 30 and the electrical inductor 50 should be coplanar but other arrangements are contemplated. In the illustrated embodiment, the electrical inductor 50 is defined as a generally planar spiral conductor. The spiral conductor may be defined in the dielectric layer that also isolates the information storage medium 22 and the capacitive plates 32, 34. The space defined between a peripheral dimension of a central opening 12 of the disc 10 and an inner radius of the storage medium 22 defines a storage medium free zone. The electrical inductor 50 may reside in the storage medium free zone while the electrically conductive capacitive plates 32, 34 typically do not extend into the storage medium free zone.

The electrically resonant circuit is configured to resonate at a frequency that complements frequencies used in electromagnetic surveillance systems. For example, RF surveillance systems commonly generate a sweep frequency between about 7 MHz and about 9 MHz. Accordingly, suitable electrically resonant circuits may be configured to resonate in this range, e.g., at about 8 MHz. For resonance of about 8 MHz, the electrical inductor may be characterized by an inductance of about 4 $\mu$H and each of the capacitors may be characterized by a capacitance of about 180 pF. More specifically, the dielectric material of the capacitors is typically polycarbonate plastic having a dielectric constant of approximately 3. The layer between the capacitor plates may be about 0.6 mm thick, so a plate area of 40 square centimeters as approximated in FIG. 1, yields a capacitance of approximately 180 pF. The two capacitors are effectively connected in series, resulting in a capacitance of 90 pF in parallel with the inductor. An inductor of approximately 4 $\mu$H will resonate at the desired frequency of 8.2 MHz with this capacitance. An inductance of 4 $\mu$H can be implemented with a single-layer spiral coil of approximately 10–15 turns with an outer diameter of 1.25 inches, as approximately shown in FIG. 1.

Microwave frequencies of about 5 GHz are also applicable to the present invention and are advantageous because they permit for smaller capacitor plate dimensions. It is contemplated that a disc according to the present invention may incorporate a plurality of resonant circuits, each resonant at a substantially different frequency, particularly where smaller sized plates are utilized. Additional layers of material such as ultraviolet-curing lacquer may be deposited on top of the above described resonant circuit structure for the purposes of labeling, decoration, or concealment of the anti-theft tag. The only requirement is that succeeding layers must be of materials compatible with the materials constituting the resonant circuit, and must not have electrical or magnetic properties that would shield or otherwise make the resonant circuit inoperative.

The information storage disc 10 of the present invention may also be provided with a deactivation fuse 60 that is configured to deactivate the resonant circuit under suitable conditions. Specifically, the fuse 60 may be configured to open and interrupt the circuit upon inducement by an external electromagnetic signal of electrical resonance at an amplitude above a given deactivation threshold. As is illustrated in detail in FIGS. 1–3, the fuse 60 may be defined as an electrical connection between one or both of the electrically conductive capacitive plates 32, 34 and the electrical inductor 50. With the exception of the fuse terminals 62, 64, the fuse 60 is insulated from the electrically conductive capacitive plate 34 and the electrical inductor 50 by a dielectric portion of the disc 10. The specific dimensions and particular conductive material of the fuse 60 are selected in accordance with particular design consideration associated with the amplitude of available or suitable deactivation signal sources. It is noted that the relative dimensions of FIG. 3 have been exaggerated, particularly along the vertical axis, to aid in illustration of the invention.

As is further illustrated in FIGS. 1–3, the electrical inductor 50 comprises a spiral conductor formed at an inner radial portion of the disc 10 while the electrically conductive capacitive plates 32, 34 are formed at an outer radial portion of the disc 10. The fuse 60 is defined as an electrical connection between an inner end of the spiral conductor and one of the capacitive plates 32, 34. A connection between an outer end of the spiral conductor and the other capacitive plate may also define a fuse. The fuse 60 extends across the spiral conductor and is insulated from the spiral conductor by a dielectric portion of the disc 10.

Figure 5:
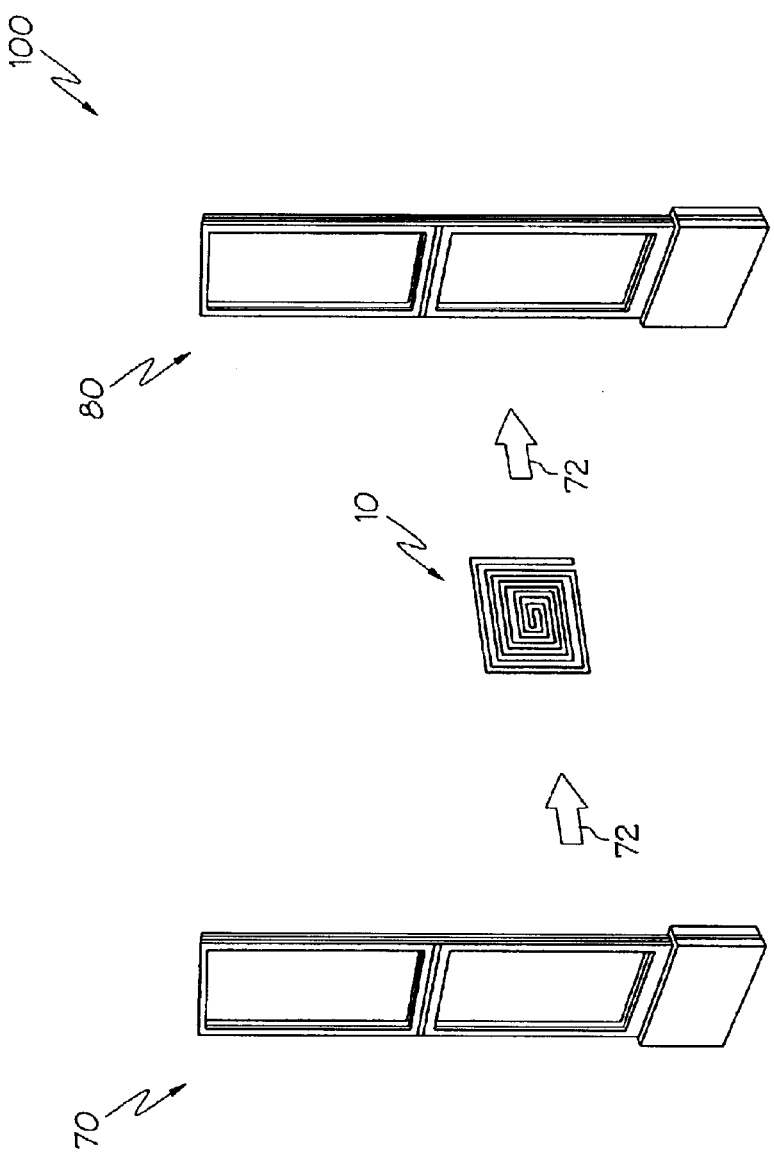
FIG. 5 is an illustration of an information storage disc surveillance system according to the present invention.

Referring to FIG. 5, the present invention also relates to the structure of an information storage disc surveillance system 100. The system 100 comprises an electromagnetic transmitter 70, an electromagnetic receiver 80, and one or more information storage discs 10 (illustrated schematically). The electromagnetic transmitter 70 is configured to generate an electromagnetic signal 72 comprising at least one predetermined frequency. The electromagnetic receiver 80 is positioned to receive the electromagnetic signal 72 and is configured to detect resonance of the signal 72, for example, when a disc 10 according to the present invention is intersected by the signal.

It is noted that the various components of the information storage disc of the present invention may be formed utilizing existing, or yet to be developed, disc fabrication techniques. For example, the capacitive plate layer and the electrical inductor may be formed by vacuum sputter, electroplating, screen printing, etc.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to introduce alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An information storage disc comprising:
    an information storage layer comprising an electrically conductive information storage medium;
    a capacitive plate layer comprising an electrically conductive capacitive plate;
    a dielectric layer comprising a dielectric portion positioned to isolate electrically said information storage medium and said capacitive plate; and
    an electrical inductor configured to complete an electrically resonant circuit comprising said electrical inductor and a dielectric capacitor, wherein said dielectric capacitor comprises at least a portion of said information storage medium, at least a portion of said electrically conductive capacitive plate, and at least a portion of said dielectric portion of said dielectric layer.

2. An information storage disc as claimed in claim 1 wherein said electrically resonant circuit is configured to resonate between about 7 MHz and about 9 MHz.

3. An information storage disc as claimed in claim 1 wherein said electrically resonant circuit is configured to resonate at about 8 MHz.

4. An information storage disc as claimed in claim 1 wherein said electrically resonant circuit is configured to resonate at RF frequencies.

5. An information storage disc as claimed in claim 1 wherein said electrically resonant circuit is configured to resonate at about 5 GHz.

6. An information storage disc as claimed in claim 1 wherein said electrically resonant circuit is configured to resonate at microwave frequencies.

7. An information storage disc as claimed in claim 1 wherein said electrically resonant circuit comprises said electrical inductor and a pair of dielectric capacitors.

8. An information storage disc as claimed in claim 7 wherein said electrical inductor is characterized by an inductance of about 4 $\mu$H.

9. An information storage disc as claimed in claim 7 wherein each of said capacitors is characterized by a capacitance of about 180 pF.

10. An information storage disc as claimed in claim 7 wherein said pair of dielectric capacitors are connected in series.

11. An information storage disc as claimed in claim 7 wherein each dielectric capacitor comprises at least a portion of said information storage medium, at least a portion of said electrically conductive capacitive plate, and at least a portion of said dielectric portion of said dielectric layer.

12. An information storage disc as claimed in claim 1 wherein said information storage disc comprises a plurality of electrically resonant circuits.

13. An information storage disc as claimed in claim 12 wherein each of said electrically resonant circuits are configured to resonate at respective substantially different resonant frequencies.

14. An information storage disc as claimed in claim 1 wherein said capacitive plate layer comprises a plurality of independent electrically conductive capacitive plates.

15. An information storage disc as claimed in claim 14 wherein said independent electrically conductive capacitive plates are coplanar.

16. An information storage disc as claimed in claim 14 wherein said capacitive plate layer comprises a pair of capacitive plate sub-layers, each including independent electrically conductive capacitive plates lying in different planes.

17. An information storage disc as claimed in claim 14 wherein:
  a first electrically conductive capacitive plate and said information storage medium form a first pair of capacitively coupled plates, and
  a second electrically conductive capacitive plate and said information storage medium form a second pair of capacitively coupled plates.

18. An information storage disc as claimed in claim 14 wherein said independent electrically conductive capacitive plates are arranged so as to exclude intersection of said plates by a single linear projection extending through said disc body, substantially perpendicular to a surface of said disc body.

19. An information storage disc as claimed in claim 14 wherein said independent electrically conductive capacitive plates and said electrical inductor are arranged so as to exclude intersection of said plates and said electrical inductor by a single linear projection extending through said disc body, substantially perpendicular to a surface of said disc body.

20. An information storage disc as claimed in claim 1 wherein:
  said capacitive plate layer comprises first and second electrically conductive capacitive plates;
  said first capacitive plate and said information storage medium form a first pair of capacitively coupled plates; and
  said second capacitive plate and said information storage medium form a second pair of capacitively coupled plates.

21. An information storage disc as claimed in claim 20 wherein said first and second electrically conductive capacitive plates and said electrical inductor are coplanar.

22. An information storage disc as claimed in claim 1 wherein said capacitive plate layer comprises a conductive coating that is substantially transparent to laser radiation.

23. An information storage disc as claimed in claim 1 wherein said capacitive plate layer comprises a conductive coating that is transparent to laser radiation.

24. An information storage disc as claimed in claim 1 wherein said electrical inductor is defined in a dielectric layer of said disc.

25. An information storage disc as claimed in claim 1 wherein said dielectric layer further comprises said electrical inductor.

26. An information storage disc as claimed in claim 1 wherein said capacitive plate and said electrical inductor are coplanar.

27. An information storage disc as claimed in claim 1 wherein said electrical inductor is defined as a generally planar spiral conductor.

28. An information storage disc as claimed in claim 27 wherein said spiral conductor is defined in a dielectric layer of said disc.

29. An information storage disc as claimed in claim 27 wherein said spiral conductor is defined in said dielectric layer comprising a dielectric portion positioned to isolate electrically said information storage medium and said capacitive plate.

30. An information storage disc as claimed in claim 1 wherein a space defined between a peripheral dimension of a central opening of said disc and an inner radius of said storage medium defines a storage medium free zone.

31. An information storage disc as claimed in claim 30 wherein said electrical inductor resides in said storage medium free zone.

32. An information storage disc as claimed in claim 31 wherein said electrically conductive capacitive plate does not extend into said storage medium free zone.

33. An information storage disc as claimed in claim 1 wherein said information storage medium and said electrical inductor are arranged so as to exclude intersection of said information storage medium and said electrical inductor by a single linear projection extending through said disc body, substantially perpendicular to a surface of said disc body.

34. An information storage disc as claimed in claim 1 wherein said electrically conductive capacitive plate and said electrical inductor are arranged so as to exclude intersection of said capacitive plate and said electrical inductor by a single linear projection extending through said disc body, substantially perpendicular to a surface of said disc body.

35. An information storage disc as claimed in claim 1 wherein said electrically resonant circuit comprises a fuse configured to open said circuit upon inducement of electrical resonance at an amplitude above a deactivation threshold.

36. An information storage disc as claimed in claim 35 wherein said fuse is defined as an electrical connection between said electrically conductive capacitive plate and said electrical inductor.

37. An information storage disc as claimed in claim 36 wherein portions of said fuse are insulated from said electrically conductive capacitive plate and said electrical inductor by a dielectric portion of said disc.

38. An information storage disc as claimed in claim 35 wherein:
  said electrical inductor comprises a spiral conductor formed at an inner radial portion of said disc;
  said electrically conductive capacitive plate layer comprises a capacitive plate formed at an outer radial portion of said disc; and
  said fuse is defined as an electrical connection between an inner end of said spiral conductor and said capacitive plate.

39. An information storage disc as claimed in claim 38 wherein said fuse extends across said spiral conductor, insulated from a majority of said spiral conductor by a dielectric portion of said disc.

40. An information storage disc as claimed in claim 1 wherein said information storage layer comprises conductive and dielectric portions.

41. An information storage disc as claimed in claim 1 wherein said information storage disc comprises a plurality of information storage layers.

42. An information storage disc as claimed in claim 1 wherein said information storage medium comprises a single, substantially planar layer of electrically conductive material.

43. An information storage disc as claimed in claim 1 wherein said information storage medium comprises a pair of substantially planar layers of electrically conductive material.

44. An information storage disc as claimed in claim 1 wherein said information storage medium carries data selected from audio, video, software, and combinations thereof.

45. An information storage disc as claimed in claim 1 wherein said information storage medium is configured for reading of data from one of said upper and lower disc surfaces.

46. An information storage disc as claimed in claim 1 wherein said information storage medium is configured for reading of data from both said upper and said lower disc surfaces.

47. An information storage disc as claimed in claim 1 wherein said information storage medium comprises a metallic layer.

48. An information storage disc as claimed in claim 1 wherein said information storage medium comprises a conductive layer.

49. An information storage disc as claimed in claim 1 wherein said information storage medium comprises a substantially planar continuous layer.

50. An information storage disc as claimed in claim 1 wherein said capacitive plate layer comprises at least one dielectric portion.

51. An information storage disc as claimed in claim 1 wherein said information storage disc comprises a plurality of dielectric layers.

52. An information storage disc as claimed in claim 51 wherein one or more of said dielectric layers comprise electrically conductive portions.

53. An information storage disc as claimed in claim 1 wherein said dielectric layer includes a plurality of dielectric portions.

54. An information storage disc as claimed in claim 53 wherein said plurality of dielectric portions are coplanar.

55. An information storage disc as claimed in claim 53 wherein said plurality of dielectric portions lie in multiple planes.

56. An information storage disc as claimed in claim 1 wherein said disc comprises a disc body defining an outer periphery, an inner periphery, and a central opening.

57. An information storage disc as claimed in claim 1 wherein said information storage disc is formatted as one of a CD and a DVD.

58. An information storage disc comprising:
a disc body defining an outer periphery, an inner periphery, and upper and lower disc surfaces;
an information storage medium disposed between said upper and lower disc surfaces, wherein
said information storage medium extends from a storage medium inner radius to a storage medium outer radius,
said storage medium defines an electrical conductivity sufficient to function as a capacitance plate of a dielectric capacitor;
at least one electrically conductive region disposed between said upper and lower disc surfaces, wherein
said electrically conductive region and said information storage medium are electrically isolated by a dielectric portion of said disc body, and
at least a portion of said electrically conductive region and at least a portion of said information storage medium extend along a common radial portion of said disc body to define a capacitively coupled pair of capacitor plates;
an electrical inductor disposed between said upper and lower disc surfaces, wherein said electrical inductor and said capacitively coupled pair of capacitor plates define an electrically resonant circuit.

59. An information storage disc surveillance system comprising:
an electromagnetic transmitter configured to generate an electromagnetic signal comprising at least one predetermined frequency;
an electromagnetic receiver positioned to receive said electromagnetic signal and configured to detect resonance of said signal; and
at least one information storage disc comprising an electrically resonant circuit configured to resonate at said predetermined frequency, wherein said information storage disc comprises:
an information storage layer comprising an electrically conductive information storage medium;
a capacitive plate layer comprising an electrically conductive capacitive plate;
a dielectric layer comprising a dielectric portion positioned to isolate electrically said information storage medium and said capacitive plate; and
an electrical inductor configured to complete said electrically resonant circuit comprising said electrical inductor and a dielectric capacitor, wherein said dielectric capacitor comprises at least a portion of said information storage medium, at least a portion of said electrically conductive capacitive plate, and at least a portion of said dielectric portion of said dielectric layer.

* * * * *